United States Patent [19]

Simoudis et al.

[11] Patent Number: 5,692,107
[45] Date of Patent: Nov. 25, 1997

[54] METHOD FOR GENERATING PREDICTIVE MODELS IN A COMPUTER SYSTEM

[75] Inventors: Evangelos Simoudis, San Mateo; Brian K. Livezey, Menlo Park; Randy G. Kerber, San Jose, all of Calif.

[73] Assignee: Lockheed Missiles & Space Company, Inc., Sunnyvale, Calif.

[21] Appl. No.: 718,226

[22] Filed: Sep. 20, 1996

Related U.S. Application Data

[63] Continuation of Ser. No. 213,191, Mar. 15, 1994.
[51] Int. Cl.⁶ .................................................. G06F 15/18
[52] U.S. Cl. ............................ 395/50; 395/75; 395/10
[58] Field of Search ........................ 395/10–13, 50–52, 395/54, 75–77, 600

[56] References Cited

PUBLICATIONS

Kaufman, K., R. Michalski, and L. Kerschberg. "Mining for Knowledge in Databases: Goals and General Description of the INLEN System." Knowledge Discovery in Databases. eds, G. Pietetsky–Shapiro and W. Frawley. AAAI/MIT 1991.

Miller, David B. "Classic Cliches". Midrange Systems, Mar. 23, 1993 v6 n6 p. 39(2).

Szladow, A. "Rough Sets Working with imperfect data". AI Expert Jul. 1993 v8 n7 p. 36(6).

Petrovsky, M. "How's your Business IQ?" HP Professional Feb. 1993 v7 n2 p. 42(3).

*Primary Examiner*—Tariq R. Hafiz
*Attorney, Agent, or Firm*—Fenwick & West LLP

[57] ABSTRACT

Data mining system including a user interface 102, a plurality of data sources 114, at least one top-down data analysis module 104 and at least one bottom-up data analysis module 104' in cooperative communication with each other and with the user interface 102, and a server processor 106 in communication with the data sources 114 and with the data analysis modules 104, 104'. Data mining method involving the integration of top-down and bottom-up data mining techniques to extract 208 predictive models from a data source 114. A data source 114 is selected 200 and used to construct 202 a target data set 108. A data analysis module is selected 203 and module specific parameters are set 205. The selected data analysis module is applied 206 to the target data set based on the set parameters. Finally, predictive models are extracted 208 based on the target data set 108.

11 Claims, 5 Drawing Sheets

METHOD FOR GENERATING PREDICTIVE MODELS IN A COMPUTER SYSTEM

This application is a continuation of Ser. No. 08/213,191 filed Mar. 15, 1994.

BACKGROUND OF THE INVENTION

1. Field of the Invention

The present invention relates generally to the field of data mining systems used to retrieve data from one or more designated databases, and relates more specifically to a system for extracting patterns and relations from data stored in databases to generate predictive models.

2. Description of Related Art

Accurate forecasting relies heavily upon the ability to analyze large amounts of data. This task is extremely difficult because of the sheer quantity of data involved and the complexity of the analyses that must be performed. The problem is exacerbated by the fact that the data often resides in multiple databases, each database having different internal file structures.

Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships.

Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. These extracted patterns and relations can be: (1) used by the user, or data analyst, to form a prediction model; (2) used to refine an existing model; and/or (3) organized into a summary of the target database. Such a search system permits searching across multiple databases.

There are two existing forms of data mining: top-down; and bottom-up. Both forms are separately available on existing systems. Top-down systems are also referred to as "pattern validation," "verification-driven data mining" and "confirmatory analysis." This is a type of analysis that allows an analyst to express a piece of knowledge, validate or validate that knowledge, and obtain the reasons for the validation oor invalidation. The validation step in a top-down analysis requires that data refuting the knowledge as well as data supporting the knowledge be considered. Bottom-up systems are also referred to as "data exploration." Bottom-up systems discover knowledge, generally in the form of patterns, in data. Existing systems rely on the specific interface associated with each database, which further limits a user's ability to dynamically interact with the system to create sets of rules and hypotheses than can be applied across several databases, each having separate structures. For large data problems, a single interface and single data mining technique significantly inhibits a user's ability to identify all appropriate patterns and relations. The goal of performing such data mining is to generate a reliable predictive model that can be applied to data sets.

Furthermore, existing systems require the user to collect and appropriately configure the relevant data, frequently from multiple and diverse data sources. Little or no guidance or support for this task is produced.

Thus, there remains a need for a system that permits a user to create a reliable predictive model using data mining across multiple and diverse databases.

SUMMARY OF THE INVENTION

The present invention involves a data mining system and method used to generate predictive models. The method involves the use of a computer system having a user interface 102, a plurality of data sources 114, such as databases, a server processor 106, at least one top-down data analysis module 104, and at least one bottom-up data analysis module 104'. The server processor 106 is in communication with the data sources 114, and with the data analysis modules 104, 105. The data analysis modules 104, 105 interact between the user interface 102 and the server processor 106.

The inventive method generally involves the integration of top-down and bottom-up data mining to generate predictive models. A first step involves selecting 200 data from the data sources 114. A target data set 108, which may be a single one of the data sources 114 or a subset of data selected from one or more of the data sources 114, is constructed 202. The user selects 203 a data analysis module, then the processor 106 generates 204 module-specific data files and specification. A predictive model is extracted 208 using the selected one of the data analysis modules and based on the target data set. The predictive models finally may be stored 209 in a repository 110 for future use.

In one embodiment, a series of user query phrases, which may be in the form of concept definitions, identified goal attributes, hypotheses, a search term, search strategy, and the like, are defined and validated against the target data set 108. The validated query phrases then are stored and selectively directed to a selected one of the bottom-up data analysis modules 104' using the server processor 106 for bottom-up processing. A predictive model, based on a set of generated rules, is extracted by the selected data analysis module 104, 104' based on the target data set 108 and the validated query phrases.

In subsequent uses of the inventive method, models stored in the repository 110 may be used to analyze and make predictions about new data. Several data analysis modules 104, 104' may be used to aid in the formulation and validation of query phrases. For example, data generated by the deductive processing module may be presented by the visualization module to make certain relationships within the data more apparent. Other modules that may be used in practicing the inventive method include clustering, case-based reasoning, inductive learning, and statistical analysis.

The present invention also includes a system incorporating and embodying the same functions and features described above.

DETAILED DESCRIPTION OF PREFERRED EMBODIMENTS

The present invention is a data mining method and system used to generate predictive models that may be applied against various data sources, such as databases. The method involves the application of top-down and bottom-up data mining techniques in a modular system.

Figure 1:
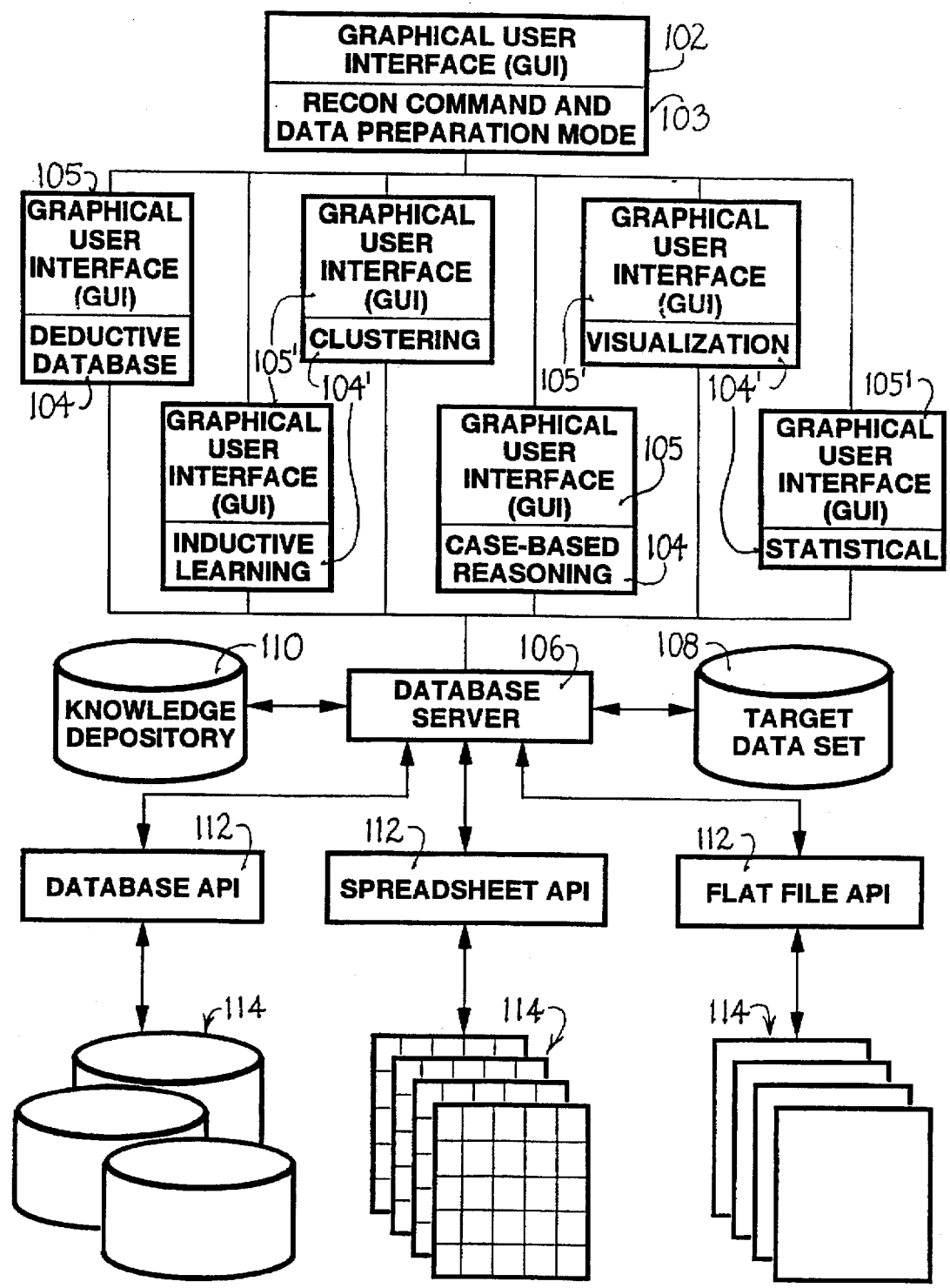
FIG. 1 is a general block diagram depicting the working environment of the present inventive method.

An exemplary environment for the present system is shown in FIG. 1. That system includes a graphical user interface (GUI) 102 through which the user interacts with the system in generating the predictive models. This first GUI 102 is associated with a command and data preparation module 103 that enables the user to generate the initial data mining request. The top GUI 102 is used for performing steps 200, 202, 203, and 204. The data preparation module 103 is in communication with a plurality of data analysis modules 104 and 104', each of which may include an associated GUI 105 or 105', respectively.

The illustrated system of FIG. 1 includes several different modules 104, 104' each of which is a different data mining component that implements a different data mining technique. Alternatively, it may be possible for a system to include a single top-down data analysis module 104 and a single bottom-up data analysis module 104', as described in further detail below. Exemplary modules 104, 104' include deductive database processing, inductive learning, clustering, case-based reasoning, visualization, and statistical analysis. Modules 104, 104' may be added or omitted from a particular system, as required by the user.

The modules 104, 104' may be custom designed for specific applications, or generally commercially available. For example, an inductive learning module 104' is available from Reduct Systems, Inc. (Regina, Canada) under the name Datalogic-R. That module creates rules from a data set that is included in a flat file. An exemplary visualization module is available under the name PV-Wave, from Visual Numerics (Colorado Springs, Co.). That product is a visualization tool that creates a variety of visualizations from data that is stored in flat files. The only commercially available deductive database processor module is that contained in RECON, available from Lockheed Martin Missiles & Space, Sunnyvale, Calif. That module interfaces with relational databases and allows its user to graphically formulate queries, concepts, and rules.

Some of the modules 104, for example the deductive database processor and the case-based reasoning modules, typically are used for top-down mining. Other modules 104', for example inductive learning, conceptual clustering, and data visualization, are used for performing bottom-up mining. The inventive system includes at least one top-down module 104 and at least one bottom-up module 104'.

The modules 104, 104' are in cooperation and in communication with each other. Information and data may be shared among the modules to extract data from identified data sources 114 based on user-defined input, such as queries. The modules 104, 104' also are in direct communication with a server processor 106. One function of the server processor 106 is to convert attributes and characteristics of a selected data source 114 to those expected by the selected module 104, 104'. Thus, a type of impedance matching is performed by the server processor 106 whenever a module is added to the system to transform the data from the data source to conform with the expected format of the selected module.

The system is built on a distributed client/server architecture, wherein each data analysis module 104, 104' is a client to the server 106. The server 106 accesses and maintains a line to a target database 108 and a knowledge repository 110 and functions to generate specifications for describing the mined data. Thus, at least indirectly, the modules 104, 104' are in communication with each other, the server 106, the repository 110, and the target data set 108.

The knowledge repository 110 is an accessible repository for the output of the present system that is stored on a storage medium and retrieved to a memory register when in use. The mined knowledge, including predictive models and validated queries, and all user-provided domain knowledge may be stored in the repository 110. The repository 110 is accessible by the server 106 which provides information from the repository 110 to the various modules 104, 104'. By placing all of this information in a single repository 110, the user-defined knowledge, which typically consists of high-level concepts and interrelations among attributes and among values in the target data set 108, may be shared among several modules and users.

The target data set 108 typically represents a subset of a larger underlying data source 114 extracted by the user. The data in the target data set 108 may be compiled from data sources 114 having different formats. For example, and as illustrated in FIG. 1, the data source may be formatted as a database, a spreadsheet, a flat file, or another format type. The server 106 is responsible for transforming the target database 108 to the necessary formats, for filling in missing values if necessary, and for locally maintaining the transformed data.

Thus, the server 106 also communicates with the various data sources 114. Typically, each data source 114 is a database having an associated database management system (DBMS) 112. However, it is possible to have data sources 114 which do not include an associated DBMS 112, for example spreadsheets and flat files. In such an instance, the server 106 acts as the translator between the output of the modules 104 and the data sources 114.

Figure 2:
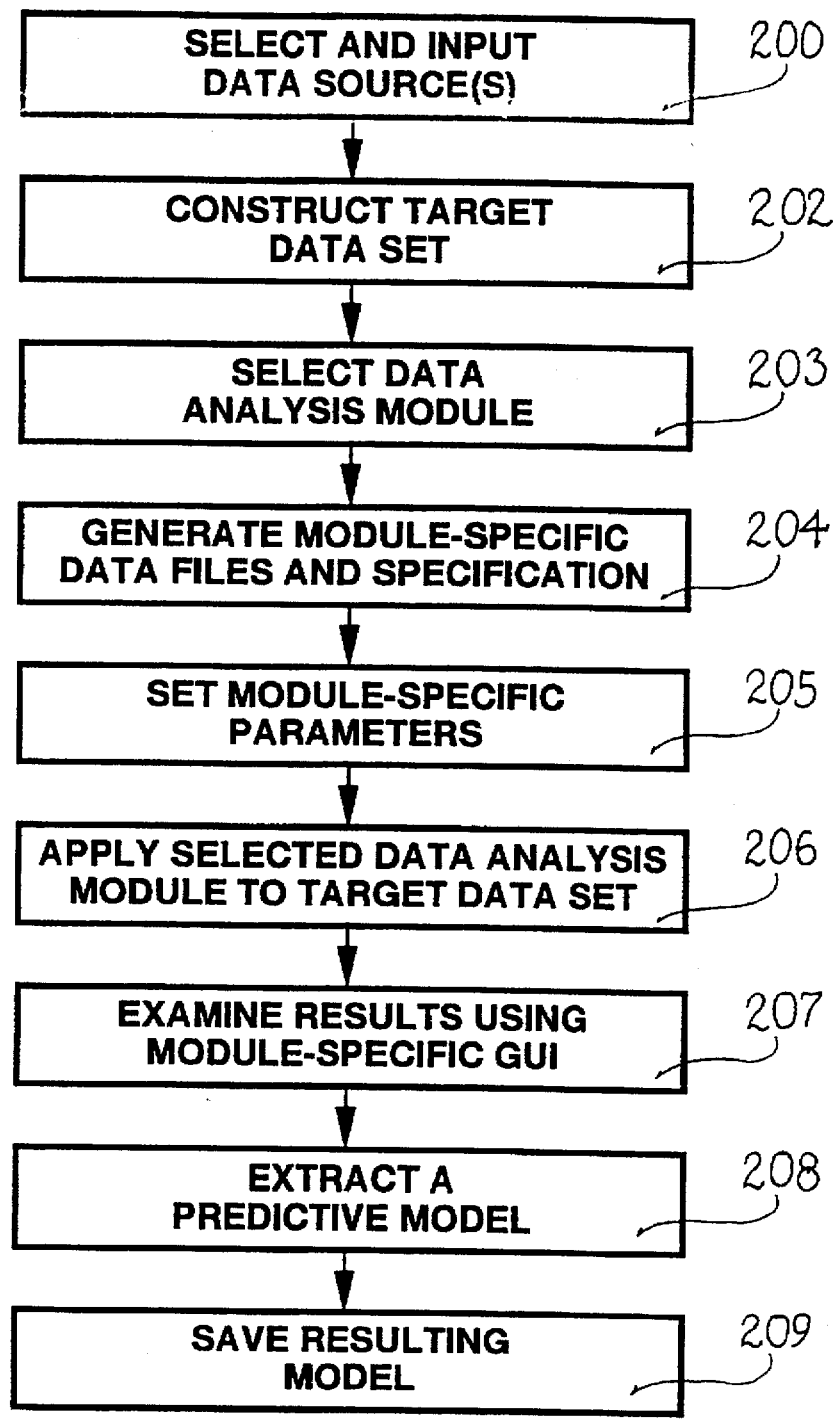
FIG. 2 is a flow diagram of an embodiment of the present invention.

Turning now to the inventive method, as shown generally in the flow diagram of FIG. 2, a data source 114 is selected 200 and input into the system. The user may direct exploration 201 of an idea, such as a query or hypothesis, in the data source 114 before constructing 202 a target data set 108 based on the selected 200 data source 114. The data source 114 preferably is a database or collection of databases, but may include a spreadsheet or flat files.

The user selects 203 a data analysis module 104 to perform data mining. Module-specific data files and a data file specification are generated 204 and stored. Module-specific parameters are set 205 using the GUI 105 of the selected data analysis module, which may be in the form of user queries or hypotheses. The selected data analysis module then is applied 206 to the target data set 108, and the results are returned to the user for examination 207 via the module GUI 105. Once the user determines that the mining results are satisfactory, a predictive model is extracted 208 based on such results. Depending on the specific application, the predictive models may include a collection of rules for symbolic models, a set of equations for statistical models, a trained neural network for neural models, and the like. The extracted predictive model then may be saved 209, for example in the knowledge repository 110.

Figure 3:
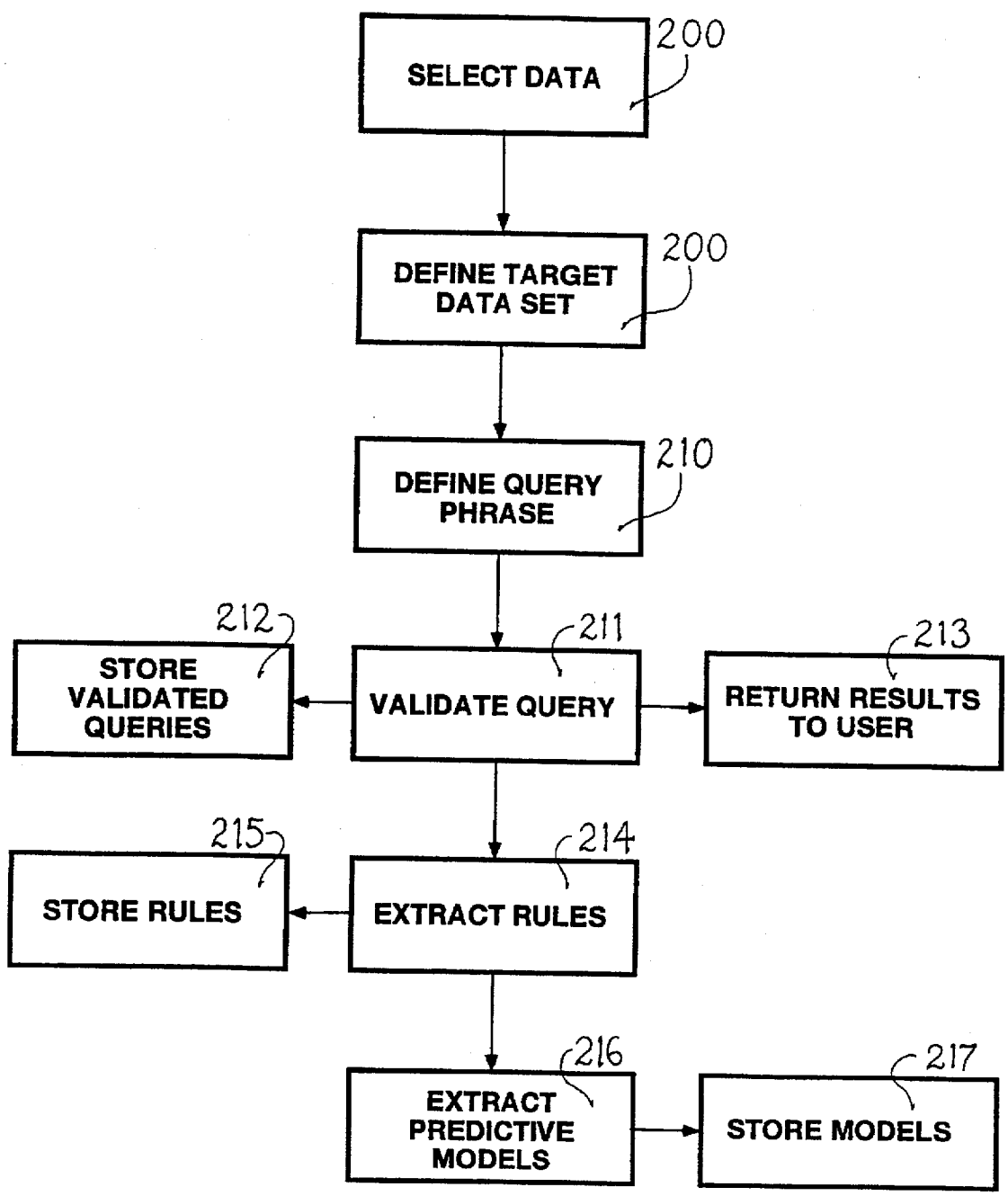
FIG. 3 is a flow diagram of an alternative embodiment of the present invention.

In an alternative embodiment, and as illustrated in FIG. 3, once the data source is selected 200 and the target data set is constructed 202, a query phrase is defined 210 using the deductive database module 104. A query phrase is a plain language query or request, such as "what is the return on investment for . . . ?". The query phrase is the basis for pattern validation, or top-down mining, since the user, through the user interface 105 of the deductive database module 104, may graphically express a pattern in the form of an "if ... then ... " form. This form typically is referred to a hypothesis. In one example, the target data set 108 is identified through user interactions with the visualization module 104'.

The server 106 receives the query phrase, then tests the query against the data in the target data set 108 to validate 211 the query. Data is retrieved from the target data set 108 responsive to the query. In one embodiment, a hypothesis is posed and data is retrieved that supports and data that refutes the hypothesis. The server 106 then reports 210 the data back to the deductive database module 104 and to the user via the user interface device 105. The user may decide whether the data supports the query, and whether the query should be considered validated at that point. The validated query may be stored in the repository 110, together with other validated queries.

It is possible that one module 104 is used to define 210 the query phrase while another module 104 is used to present the retrieved data to the user. For example, the deductive database processor module 104 may be used to define 210 a query phrase in the form of a hypothesis. The server then validates 211 the query against the target data set and returns the retrieved data in graphical form using a visualization module 104.

In addition to the patterns being proposed by the user, the target data set 108 may support additional important patterns that could be identified only by intelligently exploring its contents. Data exploration, or bottom-up mining, results in the automatic generation of several patterns, or rules. The present invention incorporates this bottom-up technique in its data mining approach.

The validated query is directed 212 by the server processor 106 to one of the bottom-up data analysis modules 104. The module then extracts 214 a set of rules using tools commercially available. Preferably, the rules making up the rule set are in the form of "if ... then" hypotheses, but may take other forms as appropriate for the specific application, such as a neural network.

The extracted rule set may be stored 215 in a knowledge repository 110 accessible by the server processor 106. The rule set may be exported to and executed by other rule-based expert systems. In a preferred embodiment, the rule set is stored 215 in the knowledge repository 110 together with the validated query phrases.

The server processor 106 combines the set of rules and the validated query phrases in the knowledge repository 110 to extract 216 a predictive model. The extraction may be automatic, whereby the bottom-up component extracts rules from the target data set 108, or may be manual, whereby the user defines the rule then checks against the target data set 108 to extract data that supports and data that refutes the rule. The predictive model thus extracted may be used against other target data sets 108 and by other systems. If modules 104 or data sources 114 are added to the system, the models may be retrieved from the knowledge repository 110 and applied or validated by those modules against new target data sets 108.

Figure 4:
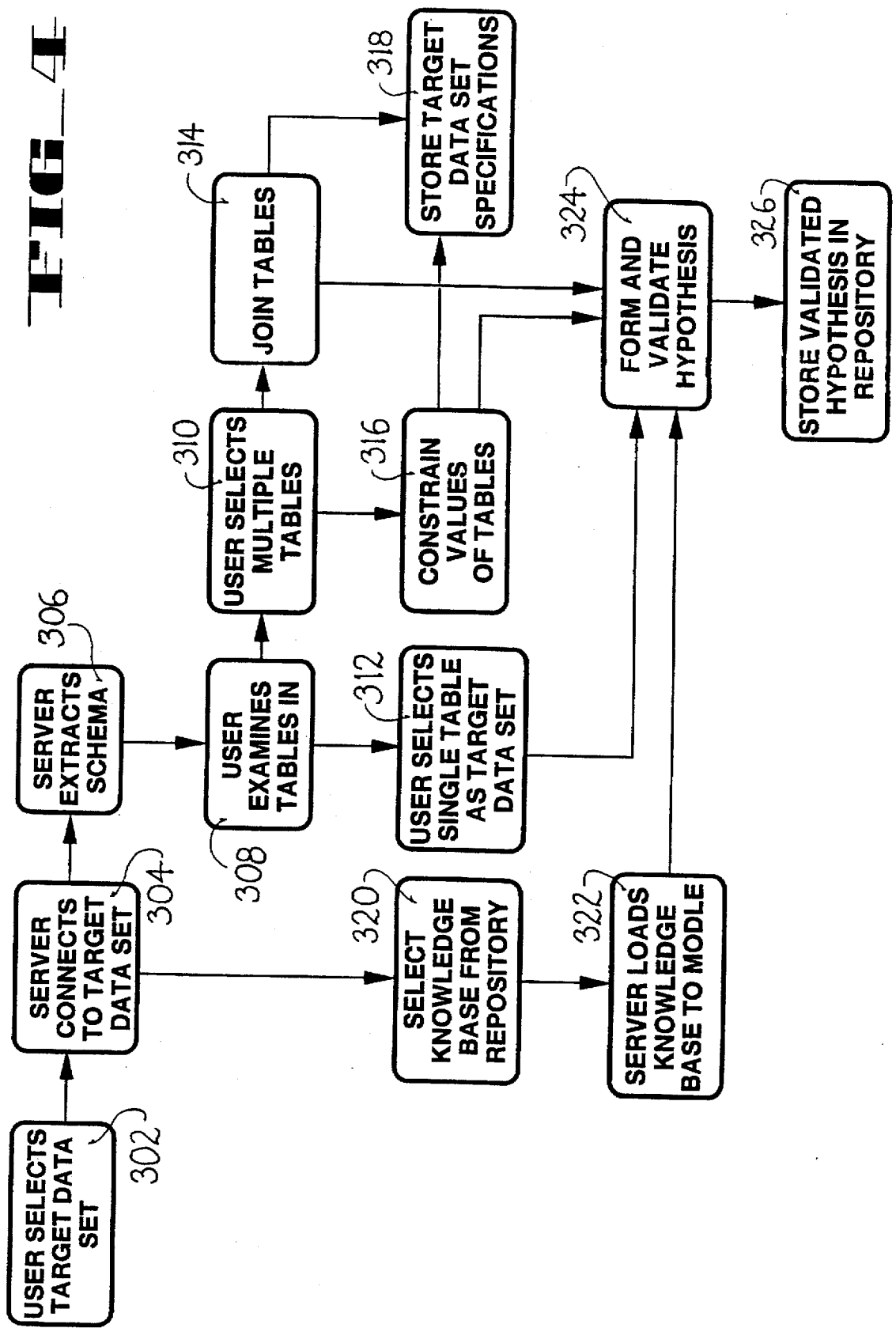
FIG. 4 is a flow diagram of an alternative embodiment of the present invention.

The present invention may be applied in a variety of embodiments, each of which depends on the types of data analysis modules 104 and data sources 114 made available to the system. Turning now to FIG. 4, that shows an embodiment of the present invention in a relational database environment. In that illustrated embodiment, a user selects 302 a data base from a listing of databases provided at the interface 102. The server connects 304 to the selected database, then extracts 306 the schema of the selected database, typically including tables containing a variety of attributes and presents the schema to the user at the interface 102. The user examines 308 each table in the schema through the user interface 102.

The user then takes one of two actions: (1) selects 310 several tables; or (2) selects 312 a single table to become the target data set 108. If more than one table is selected at step 310, then the target data set 108 may be formed by joining 314 the selected tables and by further constraining 316 the values of the selected tables. The specification for the target data set 108 formed in either of these manners is saved 318 in the server 106.

Figure 5:
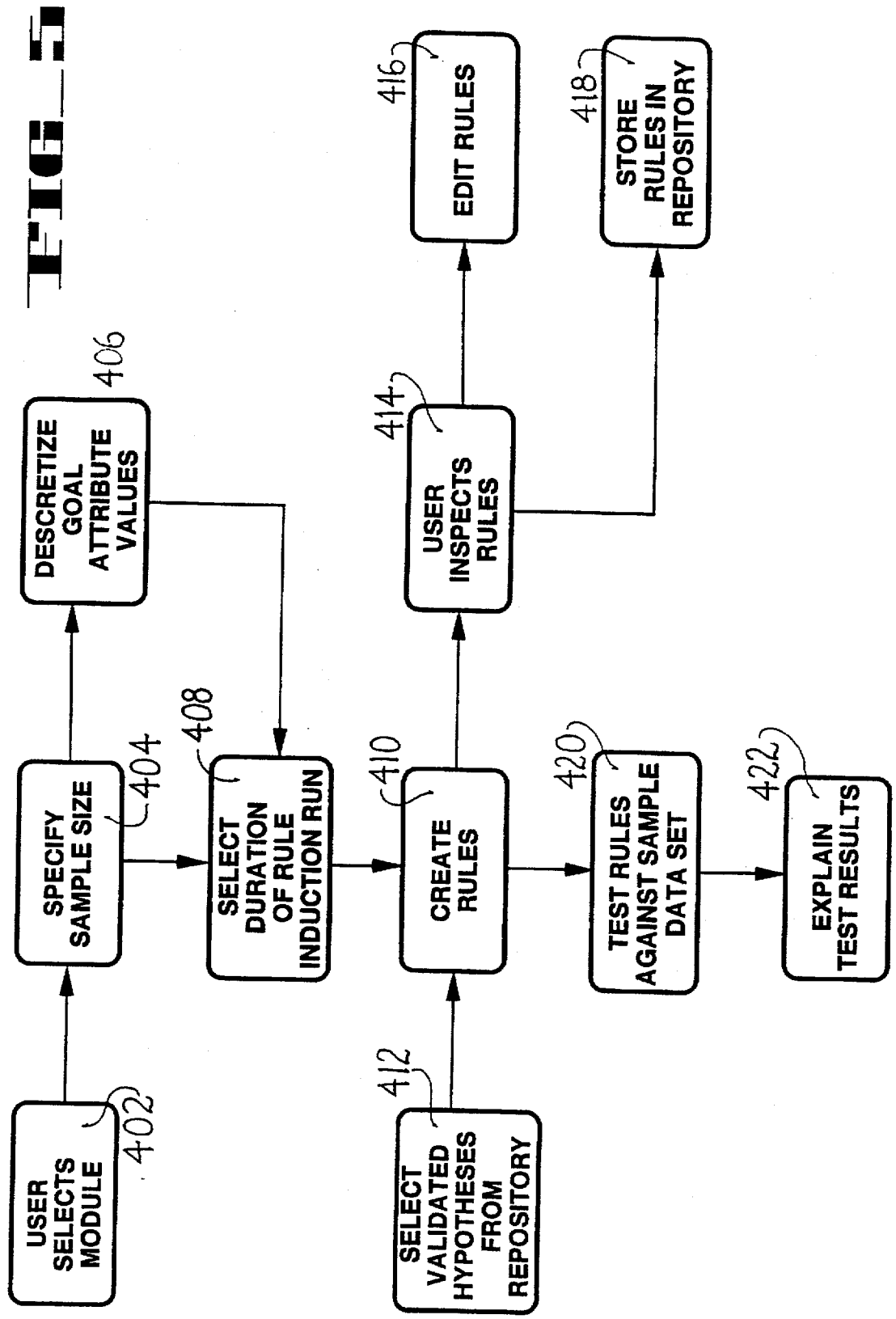
FIG. 5 is a flow diagram of an alternative embodiment of the present invention.

An exemplary bottom-up mining aspect of the present invention is illustrated by the flow chart of FIG. 5. In that example, the user selects 402 the rule induction module 104 for bottom-up mining. The user then specifies 404 the size of a sample from the target data set 108 using the user interface 102. The inductive learning module 104' may then discretize 406 the values of the numeric-valued attributes of the target data set 108, and permits the user to specify the goal attribute, which attribute is the subject of the end-result predictive model.

The user next selects 408 the duration of the rule induction run, i.e., how long the module will operate against the sample data set. Rules are automatically created 410. The user may select 412 validated hypotheses from the knowledge repository 110 that are used in generating 410 the new rules. Once the rules are created 410, the user may inspect 414 and edit 416 the rules before they are stored 418 in the knowledge repository 110 for subsequent use. In addition, the rules are tested 420, or validated, against a portion of the target data set. An explanation 422 of these test results may be presented to the user through the interface 105. The validated rules are used to further expedite the rule induction process and improve the quality of the induced rules.

In a similar manner, other modules 104 may be used by the system and in practicing the present invention. The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A data mining method for generating predictive models in a computer system, said computer system comprising:
   a user interface;
   at least one data source;
   at least one top-down data analysis module and at least one bottom-up data analysis module in cooperative communication with each other and in communication with the user interface, where the top-down data analysis module considers data supporting and refuting a piece of expressed knowledge, validates or invalidates the knowledge, and gives reasons for the validity or invalidity of the knowledge, and the bottom-up data analysis module discovers knowledge in data; and
   a server processor, in communication with each data source and with the data analysis modules;
   the method comprising the steps of:
   selecting data from at least one data source;
   constructing a target data set from the data selected from the data source(s);
   extracting a predictive model using at least one of the data analysis modules based on the target data set;

storing the predictive module for future use;

generating a knowledge base set, wherein said knowledge base set includes a set of rules, a validated query phrase, and said predictive model;

selecting the knowledge base set; and validating a query phrase against the target data set and the knowledge base set;

wherein the step of extracting a predictive model comprises performing at least one process from the group of processes consisting of: detecting a collection of rules and extracting the collection; formulating a set of equations and extracting the set; and training a neural network and extracting parameters describing the neural network.

2. A data mining method for generating predictive models in a computer system, said computer system comprising:

a user interface;

at least one data source;

at least one top-down data analysis module and at least one bottom-up data analysis module in cooperative communication with each other and in communication with the user interface, where the top-down data analysis module considers data supporting and refuting a piece of expressed knowledge, validates or invalidates the knowledge, and gives reasons for the validity or invalidity of the knowledge, and the bottom-up data analysis module discovers knowledge in data; and a server processor, in communication with each data source and with the data analysis modules; the method comprising the steps of:

selecting data from at least one data source;

constructing a target data set from the data selected from the data source(s);

extracting a predictive model using at least one of the data analysis modules based on the target data set;

storing the predictive module for future use;

generating a knowledge base set, wherein said knowledge base set includes a set of rules, a validated query phrase, and said predictive model;

selecting the knowledge base set; and validating a query phrase against the target data set and the knowledge base set;

wherein the query phrase comprises a user-defined hypothesis, the method further comprising the steps of:

forming the hypothesis, using the data analysis module;

validating the hypothesis against the target data set; and storing the validated hypothesis in the repository.

3. A data mining method for generating predictive models in a computer system, said computer system comprising:

a user interface;

at least one data source;

at least one top-down data analysis module and at least one bottom-up data analysis module in cooperative communication with each other and in communication with the user interface, where the top-down data analysis module considers data supporting and refuting a piece of expressed knowledge, validates or invalidates the knowledge, and gives reasons for the validity or invalidity of the knowledge, and the bottom-up data analysis module discovers knowledge in data; and a server processor, in communication with each data source and with the data analysis modules;

the method comprising the steps of:

selecting data from at least one data source;

constructing a target data set from the data selected from the data source(s)i extracting a predictive model using at least one of the data analysis modules based on the target data set; and storing the predictive module for future use;

wherein at least one of the data sources comprises a relational database, the method further comprising the steps of:

extracting a schema of data, including tables and attributes, from the relational database;

defining the target data set including at least one table, having at least one of the attributes, from the schema;

defining a user query phrase using one of the data analysis modules;

validating a query phrase against the target data set;

storing the validated query phrase; and selectively directing the validated query phrase to the server processor.

4. The method of claim 3, wherein the query phrase comprises a user-defined hypothesis, the method further comprising the steps of:

forming a hypothesis, using the top-down data analysis module;

validating the hypothesis against the target data set; and storing the validated hypothesis in the repository.

5. The method of claim 3, wherein the data analysis modules include a visualization module, the method further comprising the step of generating a visual display of the validated query phrase at the user interface.

6. A data mining method for generating predictive models in a computer system, said computer system comprising:

a user interface;

at least one data source;

at least one top-down data analysis module and at least one bottom-up data analysis module in cooperative communication with each other and in communication with the user interface, where the top-down data analysis module considers data supporting and refuting a piece of expressed knowledge, validates or invalidates the knowledge, and gives reasons for the validity or invalidity of the knowledge, and the bottom-up data analysis module discovers knowledge in data; and a server processor, in communication with each data source and with the data analysis modules;

the method comprising the steps of:

selecting data from at least one data source;

constructing a target data set from the data selected from the data source(s);

extracting a predictive model using at least one of the data analysis modules based on the target data set; and storing the predictive module for future use;

wherein at least one of the data sources comprises a relational database, the method further comprising the steps of:

extracting a schema of data, including tables and attributes, from the relational database; and defining the target data set including at least one table, having at least one of the attributes, from the schema;

wherein the step of defining the target data set includes the step of joining a plurality of the tables.

7. A data mining method for generating predictive models in a computer system, said computer system comprising:
   a user interface;
   at least one data source;
   at least one top-down data analysis module and at least one bottom-up data analysis module in cooperative communication with each other and in communication with the user interface, where the top-down data analysis module considers data supporting and refuting. A piece of expressed knowledge, validates or invalidates the knowledge, and gives reasons for the validity or invalidity of the knowledge, and the bottom-up data analysis module discovers knowledge in data; and
   a server processor, in communication with each data source and with the data analysis modules;
   the method comprising the steps of:
      selecting data from at least one data source;
      constructing a target data set from the data selected from the data source(s);
      extracting a predictive model using at least one of the data analysis modules based on the target data set; and
      storing the predictive module for future use;
      wherein at least one of the data sources comprises a relational database, the method further comprising the steps of:
         extracting a schema of data, including tables and attributes, from the relational database; and
         defining the target data set including at least one table, having at least one of the attributes, from the schema;
         wherein the step of defining the target data set includes the step of constraining attributes of a selected table.

8. A data mining method for generating predictive models in a computer system, said computer system comprising:
   a user interface;
   at least one data source;
   at least one top-down data analysis module and at least one bottom-up data analysis module in cooperative communication with each other and in communication with the user interface, where the top-down data analysis module considers data supporting and refuting a piece of expressed knowledge, validates or invalidates the knowledge, and gives reasons for the validity or invalidity of the knowledge, and the bottom-up data analysis module discovers knowledge in data; and
   a server processor, in communication with each data source and with the data analysis modules;
   the method comprising the steps of:
      selecting data from at least one data source;
      constructing a target data set from the data selected from the data source(s);
      extracting a predictive model using at least one of the data analysis modules based on the target set; and
      storing the predictive module for future use;
      wherein the data analysis modules include an induction module, the method further comprising the steps of:
         selecting the induction module using the user interface;
         altering the target data set using user-specified parameters;
         specifying a goal attribute; and
         generating predictive modules in the form of rules.

9. The method of claim 8, further comprising the step of editing the set of rules in accordance with user-specified parameters using the user interface.

10. The method of claim 9, further comprising the step of storing the edited set of rules in the repository.

11. The method of claim 8, further comprising the step of testing the set of rules against the altered target data set.

* * * * *